United States Patent [19]
Ando et al.

[11] 3,943,345
[45] Mar. 9, 1976

[54] DIGITAL ACCELERATION DETECTING SYSTEM

[75] Inventors: Noriyoshi Ando, Kariya; Hiroaki Yamaguchi, Anjo, both of Japan

[73] Assignee: Nippon Soken, Inc., Nishio, Japan

[22] Filed: July 16, 1974

[21] Appl. No.: 488,938

[52] U.S. Cl..... 235/151.32; 235/150.2; 235/92 AE; 303/21 CG
[51] Int. Cl.² ...................... B60T 8/12; G06F 15/20
[58] Field of Search............ 235/183, 151.32, 150.2, 235/150.24, 150.51, 92 AE; 303/21 CG, 21 EB

[56] References Cited
UNITED STATES PATENTS

| | | | |
|---|---|---|---|
| 3,744,854 | 7/1973 | Ooya et al. | 303/21 CG |
| 3,746,925 | 7/1973 | Schaepman | 303/21 CG |
| 3,776,604 | 12/1973 | Ooya et al. | 303/21 EB |
| 3,806,205 | 4/1974 | Hida et al. | 303/21 CG |
| 3,843,210 | 10/1974 | Portas et al. | 303/21 CG |

FOREIGN PATENTS OR APPLICATIONS

1,548,794   9/1969   Germany ........................... 235/183

*Primary Examiner*—Felix D. Gruber
*Attorney, Agent, or Firm*—Cushman, Darby & Cushman

[57] ABSTRACT

There is provided a digital acceleration detecting system for rotating bodies comprising a first counter for counting the number of pulse signals corresponding to the rotational speed of a rotating body, a second counter for counting the number of the pulse signals later than the first counter, and a control circuit for generating an output signal corresponding to the difference between the counts of the first and second counters.

5 Claims, 12 Drawing Figures

DIGITAL ACCELERATION DETECTING SYSTEM

BACKGROUND OF THE INVENTION

1. Field of the Invention

The present invention relates to an acceleration detecting system for rotating bodies of the type which may for example be incorporated advantageously in an anti-skid control system for preventing an irregular gyration of a vehicle which results when the rotation of the wheels is stopped by an excessively large braking force during the braking of the vehicle.

2. Description of the Prior Art

For example, anti-skid control systems for vehicles are known in the art which comprises a generator for generating a DC voltage corresponding to the rotational speed of a wheel, a differentiation circuit for generating an output voltage only when the DC voltage changes suddenly, and a braking force control unit for forcibly releasing the braking force applied to the wheel only when the differentiation circuit generates an output voltage, whereby when the rotation of the wheel decreases rapidly so that there is a tendency for the wheel to lock, the braking force is released to prevent the locking of the wheel.

However, due to the fact that the sudden deceleration of the wheel rotation is detected in terms of a variation of the DC voltage or in terms of a negative acceleration obtained by differentiating the wheel speed, the anti-skid control system of the above type has a disadvantage and any attempt to overcome this disadvantage inevitably tends to make the system considerably high in cost and complicated in construction. In other words, though small in quantity, the output voltage of the generator includes a ripple component. That is, even the output voltage of a DC generator or the output voltage obtained by rectifying and smoothing the output voltage of an AC generator necessarily contains a ripple component and therefore the output voltage varies due to the ripple component even when the rotation of the wheel is smooth, causing an erroneous operation of the system in which the differentiation circuit is caused by the ripple component to erroneously generate an output voltage and the braking force control unit is energized to release the braking force.

While, in an attempt to overcome the foregoing difficulty, the number of poles in a generator may be increased to reduce the ripple voltage, this has the effect of making the generator bulkier and heavier. In this case, if the size and weight of the generator are not increased, the output voltage is decreased so that the superposition of external noise or the like on this DC output voltage may cause the system to operate erroneously. Further, if a capacitor or the like is connected to the generator to smooth the DC output voltage to a greater extent, contrary to the above-mentioned case, when the rotation of the wheel actually decreases suddenly, the resultant DC output voltage fails to follow this sudden deceleration so that at the expiration of a considerable time following the sudden deceleration of the wheel, the differentiation circuit generates an output voltage to release the braking force. This has a very detrimental effect so that in an extreme case the braking force will be released only after the stoppage of the wheel rotation.

There is another disadvantage that in order to detect variations of the DC voltage the DC voltage must always assume a value proportional to the rotational speed of the wheel, otherwise the same time rate of change or the angular acceleration of the wheel rotational speed shows a difference between the high wheel rotational speed and the low wheel rational speed. Also, with the differentiation circuit, if its output is allowed to vary with the magnitude of the DC voltage, it gives rise to a difficult situation in which the rate of change of the DC voltage or the time rate of change (acceleration) of the wheel rotation cannot be detected accurately. While all of these difficulties arise from the fact that the rotational speed of a wheel is converted into a DC voltage which is an analog quantity and this DC analog voltage value is then differentiated, any attempts to overcome these difficulties by using a generator which operates with a high degree of accuracy, that is, a generator which is capable of always generating the same output voltage for variations in the ambient temperature and the like and by reducing the variations in the performance of individual elements of the same type caused during the manufacturing process, inevitably have the disadvantage of making the system expensive. Also with the differentiation circuit, the operating characteristics of its component elements such as transistors vary considerably with temperature changes and their characteristics also vary with variations of the power supply voltage. Consequently, it is necessary to use many component elements such as a temperature compensating circuit, a voltage compensating circuit, etc., which are necessary for controlling the variations of the characteristics below the predetermined values, but which have no direct bearing on the essential operation of the system, that is, there are also the disadvantages of making the system expensive, unnecessarily complicated in construction and difficult to operate.

SUMMARY OF THE INVENTION

With a view to overcoming the foregoing difficulty, it is an object of the present invention to provide a digital acceleration detecting system comprising a first counter and a second counter for respectively counting the number of pulse signals corresponding to the rotational speed of a rotating body subjected to detection, a control circuit for determining the beginning and end of the counting operation of the first and second counters, respectively, and generating an output signal having a duration corresponding to the count of the first and second counters, respectively, and a clock pulse oscillator for generating clock pulses having a predetermined frequency and used for actuating the control circuit, wherein the first counter counts the number of the pulse signals during a time period $T_1$ from a time $t_1$, the second counter counts the pulse signals for $T_1$ seconds from a time $t_2$ which is $\Delta t$ seconds later than the time $t_1$ and thereafter the clock pulses are counted by the first and second counters from a time $t_3$ to generate an output signal corresponding to the difference between the count of the one counter obtained during the $T_1$ seconds and the count of the other counter obtained during $T_1$ seconds.

The system according to the invention has among its great advantages the fact that it is capable of eliminating the danger of erroneous operation due to ripple components by using a novel computing method in which the number of pulse signals corresponding to the rotational speed of a rotating object subjected to detection such as a wheel is counted.

Another great advantage of the system of the invention is that where the number of pulse signals per revolution of the wheel is increased to detect small variations of the wheel rotation, the use of the pulse signals or digital signals in place of a DC voltage value or analog voltage value used in the conventional system makes it possible to readily amplify and rectify the output voltage of any small value and at the same time external noise is not easily superposed on the output signal.

Still another great advantage of the invention is that since the pulse signals express a meaning only by the presence or absence of a pulse signal and this is independent of their voltage value, any slight variation in the amplitude of these pulse signals does not cause any operating difficulty, i.e., the use of a temperature compensating circuit or the like for maintaining the pulse amplitude at a present value is eliminated, making the system simple in construction, easy to operate and inexpensive.

Still another great advantage of the system is the use of a so-called digital differentiation in which the second counter starts counting the pulse signals at the expiration of $\Delta t$ seconds after the first counter has started counting the pulse signals and thereafter the difference between the counts of the first and second counts is detected to detect the rate of change of the rotational speed of the wheel. Consequently, as compared with the conventional differentiation methods of analog type, the system of this invention is not affected by temperature changes, voltage variations, etc., and hence it is free from erroneous operation, thus requiring no compensating actions for temperature and voltage variations.

DESCRIPTION OF THE PREFERRED EMBODIMENT

The present invention will now be described in greater detail with reference to the illustrated embodiment. In the embodiment shown in FIG. 1, the digital acceleration detecting system according to the invention is incorporated in an anti-skid control system for a vehicle.

Figure 1:
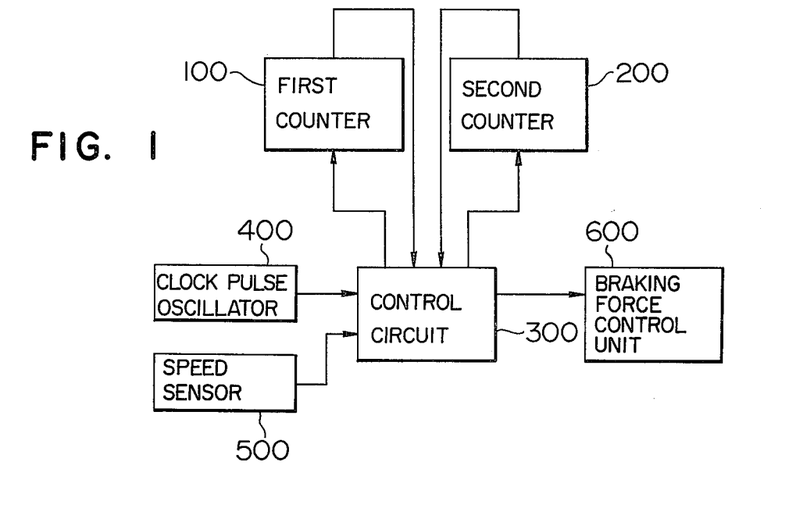
FIG. 1 is a block diagram showing an embodiment of an anti-skid control system for vehicle incorporating a digital acceleration detecting system according to the present invention.

Referring first to FIG. 1, numeral 100 designates a first counter for counting the number of pulse signals correlated to the rotation of a vehicle wheel during a predetermined period of time and counting the number of clock pulses of a predetermined frequency during the subsequent predetermined period of time. Numeral 200 designates a second counter for counting the number of the pulse signals correlated to the rotation of the wheel during the predetermined time starting at a time $\Delta t$ seconds later than the initiation of the counting by the first counter and for counting the number of the clock pulses of the predetermined frequency during the succeeding predetermined period. Numeral 300 designates a control circuit for supplying to the first counter 100 and the second counter 200, respectively, pulse signals wc correlated to the rotation of the wheel only during the predetermined period and clock pulses CP1 during the succeeding predetermined period and for generating, as its output signal, a signal for releasing the braking force applied to the wheel for a period of time corresponding to the difference between the counts of the first and second counters 100 and 200. Numeral 400 designates a clock pulse oscillator for always oscillating at a predetermined frequency and supplying the clock pulses CP1 for counting purposes to the first counter 100 and the second counter 200 through the control circuit 300, 500 a speed sensor comprising a sensor mounted on the axle shaft of the wheel for generating the pulse signals we correlated with the rotational speed of the wheel. Numeral 600 designates a braking force control unit whereby when it is energized, the braking force is forcibly released to prevent the locking of the wheel even when the brake pedal is being depressed by the driver to apply the braking force to the wheel, whereas when it is deenergized, the braking action is effected as desired by the driver by depressing the brake pedal. Here, the construction and operation of the braking force control unit 600 will not be described in detail, since it is identical with the one used in the known anti-skid control systems.

Figure 2:
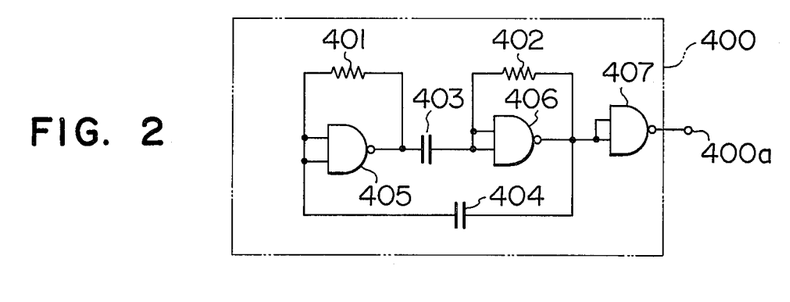
FIG. 2 is a wiring diagram showing an exemplary form of the clock pulse oscillator used in the system of FIG. 1.
Figure 12:
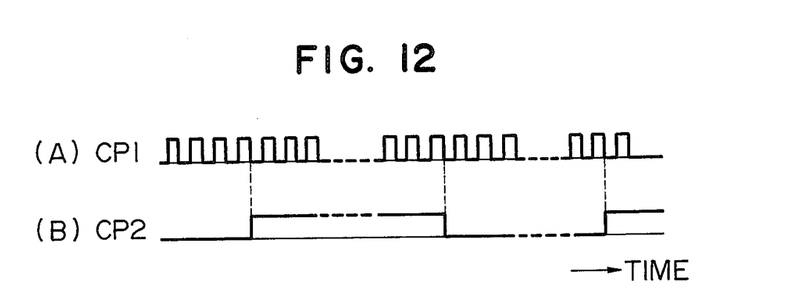

The clock pulse oscillator 400 for generating the clock pulses CP1 is constructed as shown in FIG. 2, in which numerals 401 and 402 designate resistors. Numerals 403 and 404 designate capacitors, 405, 406 and 407 two-input NAND elements. These two-input NAND elements are known in the art as monolithic integrated circuits and therefore they will not be described in detail. Numeral 400a designates an output terminal where there are generated the clock pulses CP1 shown in FIG. 12(A) and having a predetermined frequency determined by the values of the resistors 401 and 402 and the capacitors 403 and 404. The operation of the oscillator 400 constructed as described is well known to those skilled in the art and therefore it will not be described in any detail. Further, the clock pulse oscillator used in the system of this invention is not limited to the exemplary form shown in FIG. 2 and thus a crystal oscillator employing a crystal resonator may also be used as the clock pulse oscillator without any inconvenience.

Figure 3:
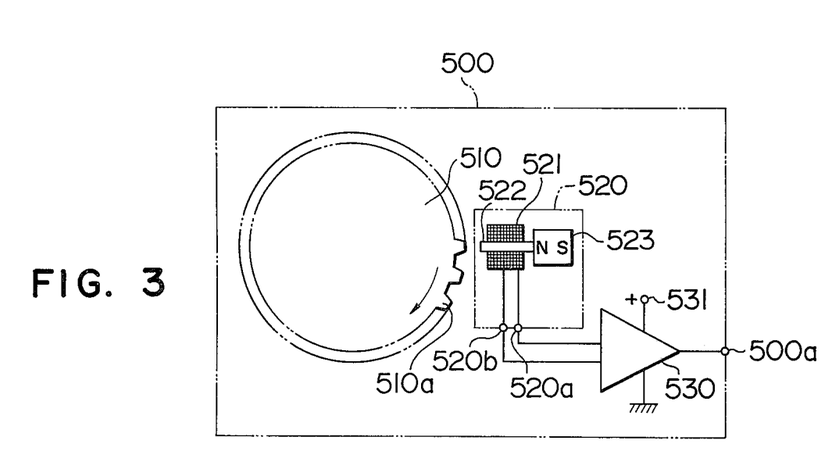
FIG. 3 is a wiring diagram showing an exemplary form of the speed sensor used in the system of FIG. 1.

The speed sensor 500 is constructed as shown in FIG. 3, in which numeral 510 designates a toothed wheel of a magnetic material which is formed with a plurality of projections 510a on its circumference and which is driven from the axle shaft of the wheel, 520 a pulse sensor, 521 a winding, 522 a fixed core arranged to provide a certain gap between it and the projections 510a of the toothed wheel 510, 523 a permanent magnet for applying a magnetic flux through the fixed core 522 so that the magnetic flux changes with the movement of the projections 510a on the toothed wheel 510, 520a and 520b output terminals of the pulse sensor 520. Numeral 530 designates an amplifier for amplifying and reshaping into a rectangular wave the output voltage generated across the output terminals 520a and 520b in accordance with the rotation of the toothed wheel 510, 531 a terminal for connection to a power source. With the construction described, the rectangular waves or pulse signals wc generated at the output terminal 500a are correlated with the rotational speed of the toothed wheel 510, i.e., the rotational speed of the wheel, and the number of the pulse signals wc generated in unit time is proportional to the rotational speed of the wheel. Therefore, the rotational speed V of the wheel is given us $$V = K \frac{n}{T}$$

where
$K$ = proportionality constant
$n$ = number of pulse signals we generated in unit time T.

The construction and operation of the amplifier 530 will not be described in detail, since it is well known in the art.

Figure 4:
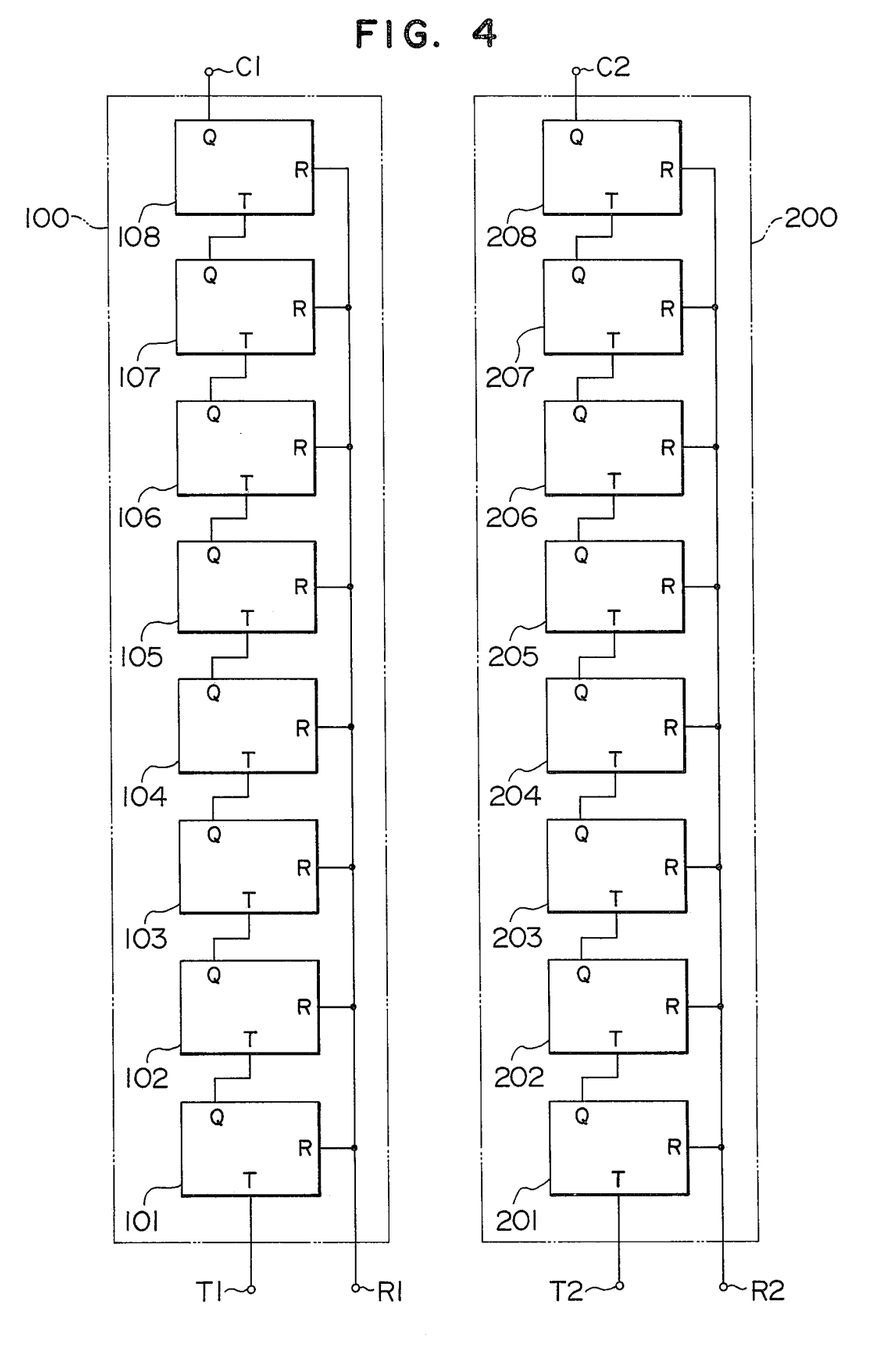
FIG. 4 is a wiring diagram showing an exemplary form of the first and second counters used in the system of FIG. 1.

The first counter 100 and the second counter 200 are constructed as shown in FIG. 4. The first counter 100 comprises a binary counter in which numerals 101, 102, 103, 104, 105, 106, 107 and 108 designate flip-flops (hereinafter referred to as FF's), T1 an input terminal for receiving pulse signals to be counted, R1 a reset terminal which goes to a high (H) level for causing the FF's 101 through 108 to perform the counting and which goes to a low (L) level for resetting all the FF's, C1 a carry output terminal which goes to the L level when all of output terminals Q of the FF's 101 through 108 go to the H Level and then a pulse signal is applied to the input terminal T1. The construction and operation of the FF's 101 through 108 are well known in the art and therefore they will not be described in detail. The second counter 200 comprises a binary counter identical in construction and operation with the first counter 100, in which numerals 201, 202, 203, 204, 205, 206, 207 and 208 designate FF's, T2 an input terminal for receiving pulse signals to be counted, R2 a reset terminal which goes to the H level for causing the counter 200 to perform the operation of counting and which goes to the L level for resetting the counter 200, C2 a carry output signal which goes to the L level by a pulse signal applied to the input terminal T2 after all of output terminals Q of the FF's 201 through 208 have gone to the H level.

Figure 5:
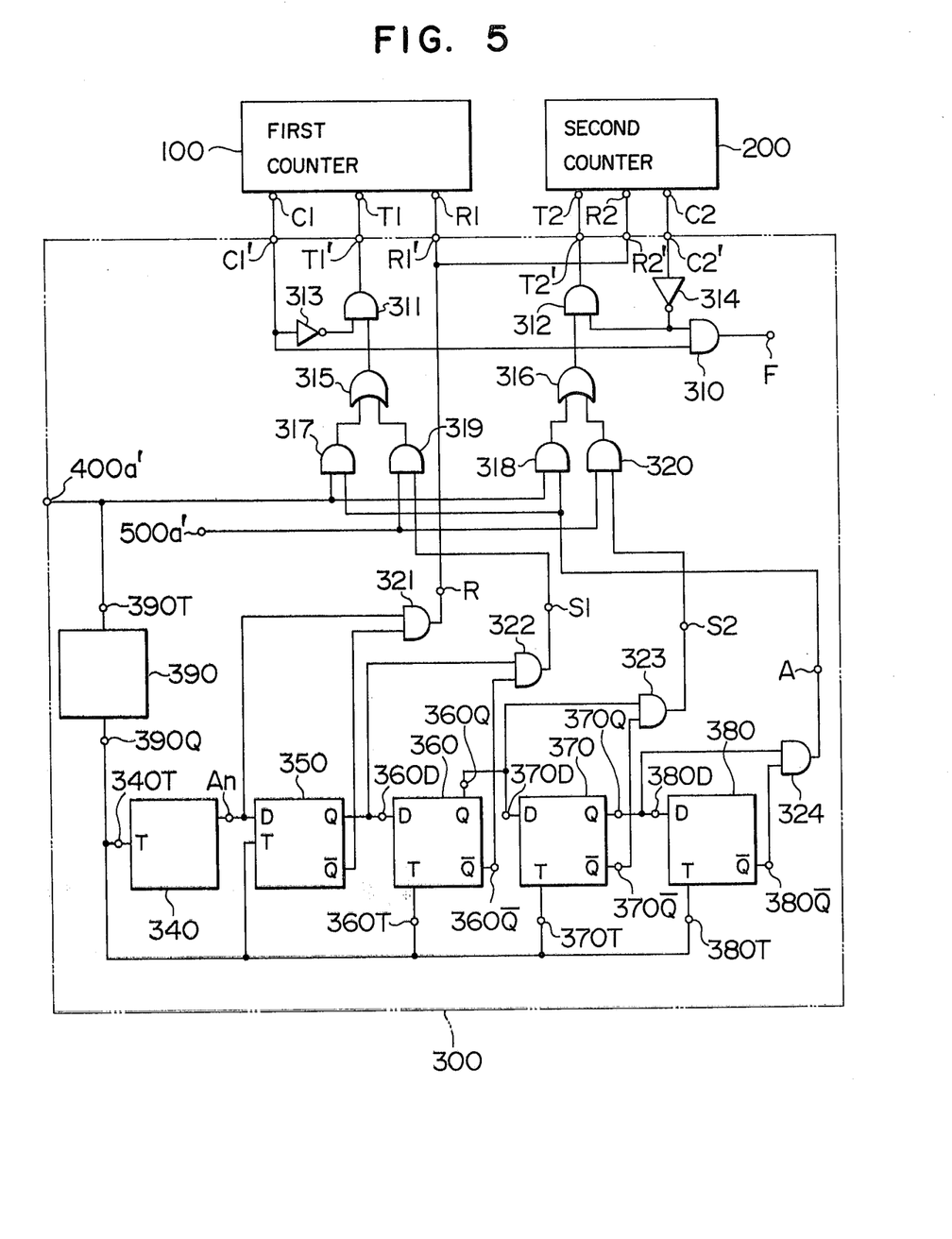
FIG. 5 is a wiring diagram showing an exemplary form of the control circuit used in the system of FIG. 1.

The control circuit 300 is constructed as shown in FIG. 5, in which numeral 400a' designates an input terminal for receiving clock pulses CP1, 500a' designates an input terminal for pulse signals wc, and C1', T1' and R1' designate, respectively a carry input terminal, a pulse output terminal and a reset output terminal. Terminals C1; T1' and R1' are respectively connected to the carry output terminal C1, the pulse input terminal T1 and the reset terminal R1 of the first counter 100. Similarly, designated as C2', T2' and R2' are a carry input terminal, a pulse output terminal and a reset output terminal respectively connected to the carry output terminal C2, the pulse input terminal T2 and the reset terminal R2 of the second counter 200. Numerals 310, 311 and 312 designate two-input AND elements, 313 and 314 NOT elements, 315 and 316 OR elements, 317, 319, 318 and 320 two-input AND elements. Designated as R, S1, S2, A and An are terminals where there are respectively delivered a reset signal $r$, signal $s1$, signals $s2$, signal $a$ and signal $an$. Numerals 321, 322, 323 and 324 designate two-input AND elements for respectively generating the reset signal $r$, signal $s1$, signal $s2$ and signal $a$, 340 a frequency divider circuit, 340T an input terminal for receiving pulse signals which are to be subjected to frequency division. The terminal An constitutes an output terminal for the signal $an$ divided by the frequency divider circuit 340. Numeral 350 designates a D-type flip-flop (hereinafter referred to as a D-FF) whereby the signal $an$ supplied to its D input terminal is delivered to its output terminal Q after a delay of one bit period. Numeral 390 designates a frequency divider circuit whereby the input clock pulses CP1 shown in FIG. 12(A) are divided to produce a clock pulse CP2 shown in FIG. 12(B), 390T an input terminal for receiving the clock pulses CP1, 390Q an output terminal for the clock pulse CP2 obtained by frequency dividing the clock pulses CP1. Numeral 360 designates a 6-bit shift register, 360D an input terminal, 360T an input terminal for the clock pulse CP2, 360Q an output terminal where the signal applied to the input terminal 360D appears after a delay of three bit periods, 360$\overline{Q}$ an inverted output terminal where the signal generated at the output terminal 360Q appears after a further delay of three bit periods and in its inverted form. Numeral 370 designates a 6-bit shift registor, 370D an input terminal, 370T an input terminal for receiving the clock pulse CP2, 370Q an output terminal where an output is produced after a delay of 6 bit period after the application of a signal to the input terminal 370D 370$\overline{Q}$ an inverted output terminal where an output signal is always generated which is opposite in level to the output signal generated at the output terminal 370Q. Numeral 380 designates a 3-bit shift register, 380D an input signal, 380T an input terminal for the clock pulse CP2, 380$\overline{Q}$ an inverted output terminal where an inverted output replica of the input signal to the input terminal 380D appears after a delay of 3 bit periods.

Figure 6:
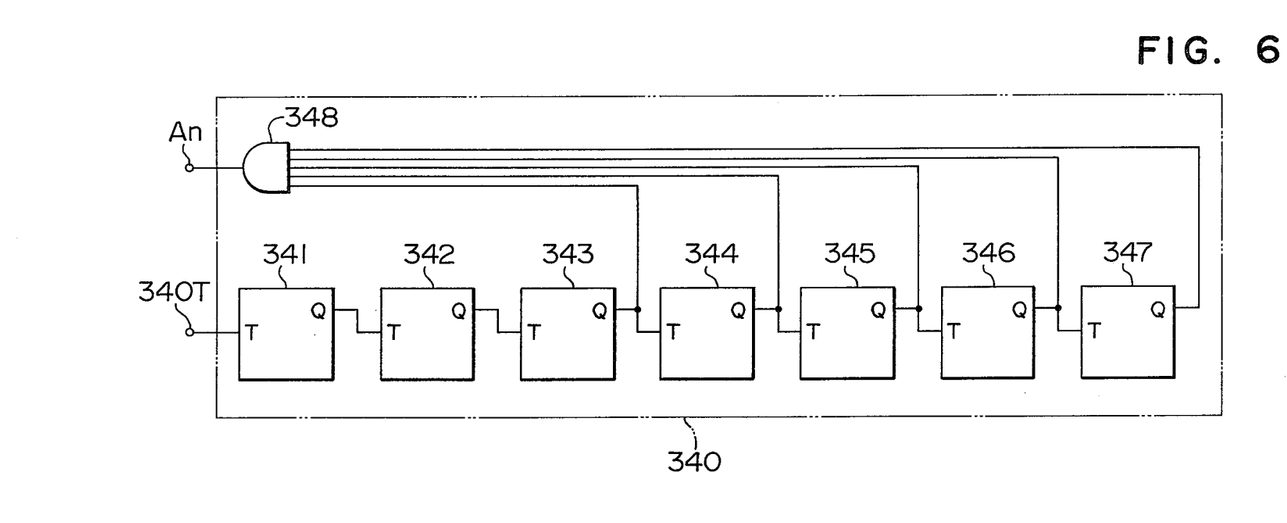
FIGS. 6 and 7 are wiring diagrams showing exemplary forms of the two different types of frequency divider circuit used in the control circuit shown in FIG. 5.

The circuit construction of the frequency divider circuit 340 is shown in FIG. 6, in which numeral 348 designates a five-input AND element, 341, 342, 343, 344, 345, 346 and 347 FF's. The five-input AND element 348 is of a known type and therefore its construction and operation will not be described.

Figure 7:
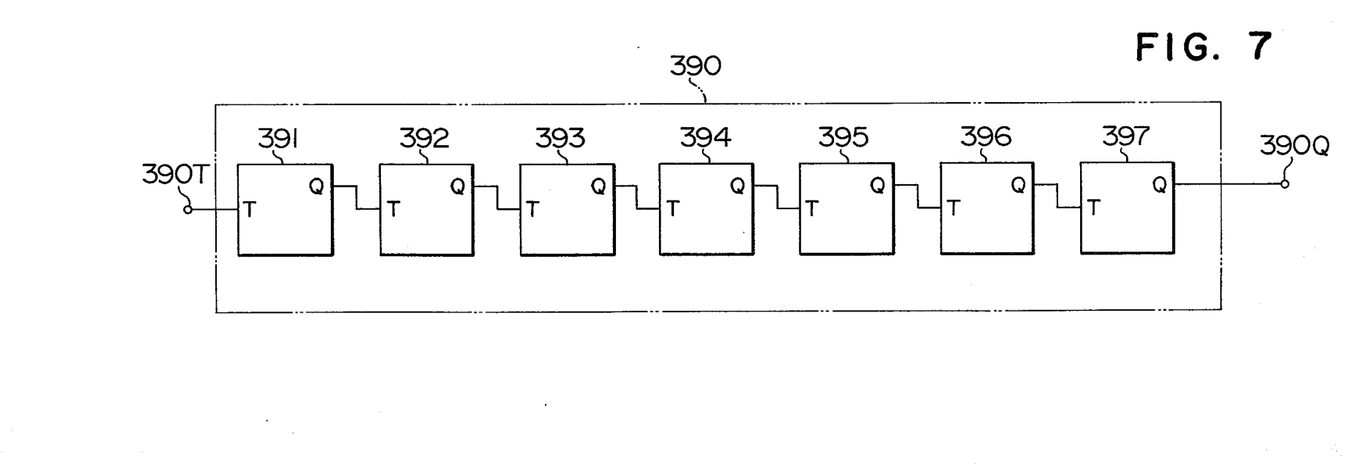

The construction of the frequency divider circuit 390 is shown in FIG. 7, in which 390T designates an input terminal for receiving the clock pulses CP1, 390Q an output terminal for the frequency divided clock pulse CP2, 391, 392, 393, 394, 395, 396 and 397 FF's.

Figure 8:
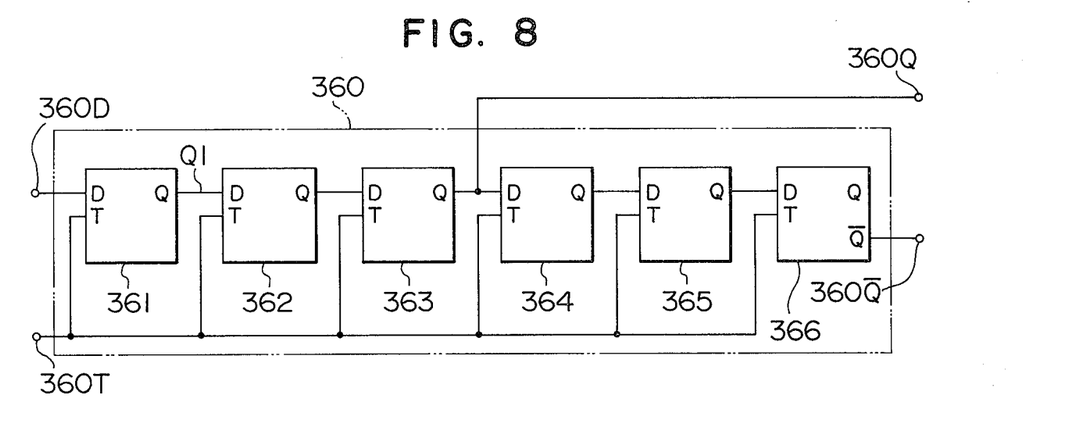
FIGS. 8 and 9 are wiring diagrams showing exemplary forms of the two different types of 6-bit shift registers.

The 6-bit shift register 360 is constructed as shown in FIG. 8, in which numerals 361, 362, 363, 364, 365 and 366 designate D-FF's.

Figure 9:
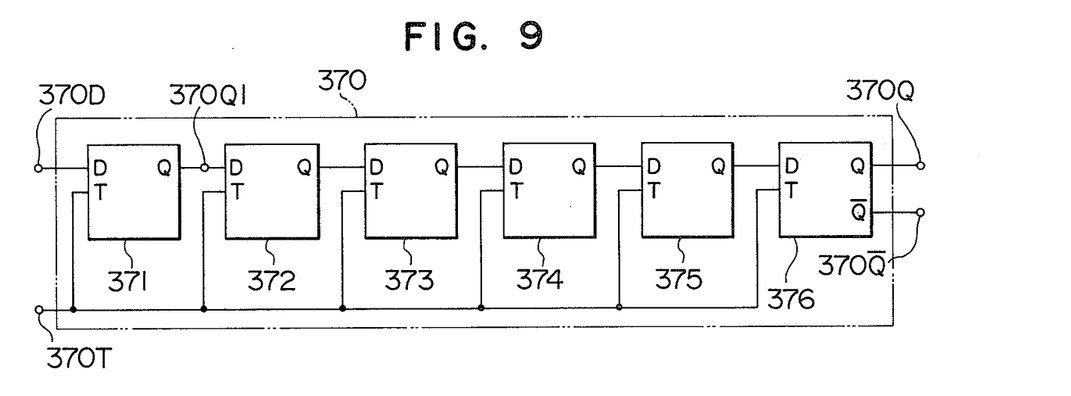

The 6-bit shift register 370 is constructed as shown in FIG. 9, in which numeral 371, 372, 373, 374, 375 and 376 designate D-FF's, 370Q1 an output terminal of the D-FF 371.

Figure 10:
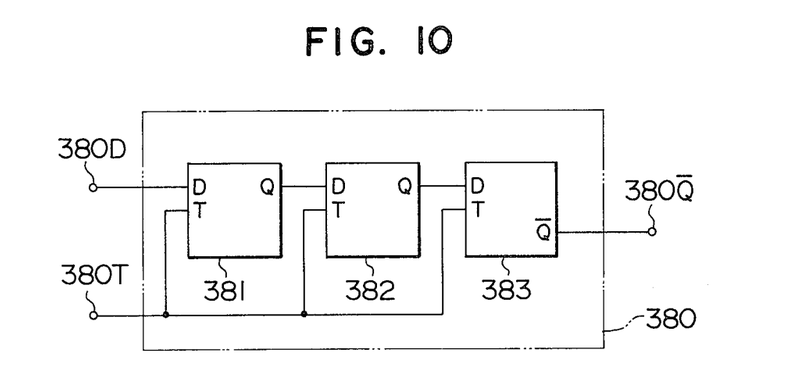
FIG. 10 is a wiring diagram showing an exemplary form of the 3-bit shift register used in the control circuit shown in FIG. 5.

The 3-bit shift register 380 is constructed as shown in FIG. 10, in which numerals 381, 382 and 383 designate D-FF's.

Figure 11:
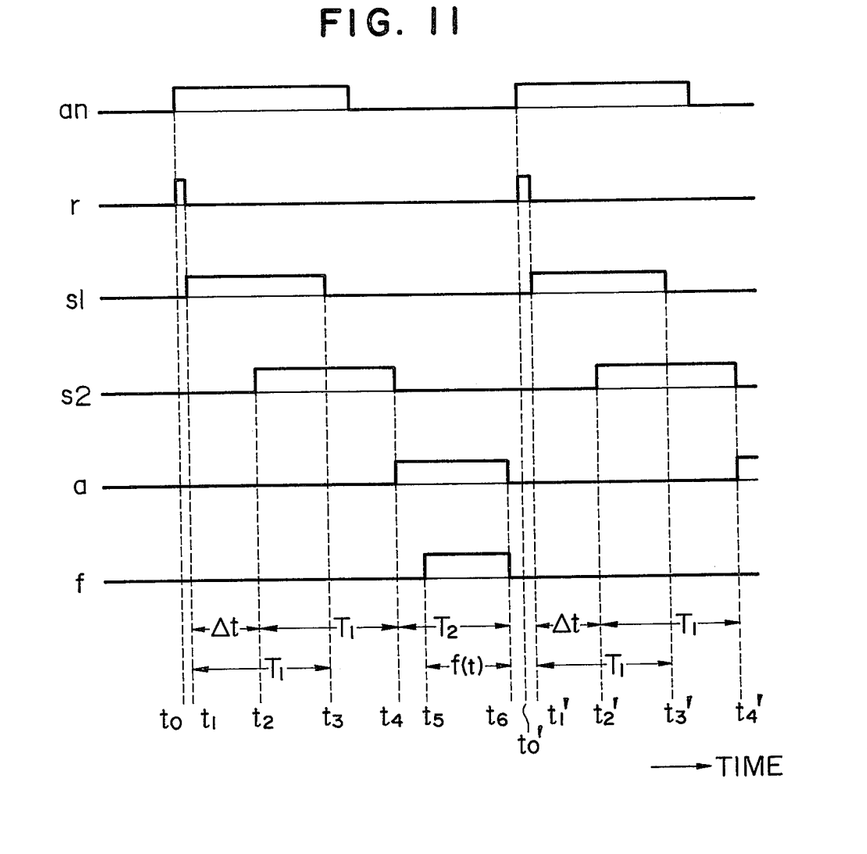
FIGS. 11 and 12 are waveform diagrams showing the voltage waveforms generated at various points in the system for explaining the operation thereof.

FIGS. 11-$an$, 11-$r$, 11-$s1$, 11-$s2$, 11-$a$ and 11-$f$ respectively show the voltage waveforms in time of the signals generated at the terminals A$n$, R1 and R2, S1, S2, A and F. FIGS. 12(A) and 12(B) show respectively the waveforms of the clock pulses CP1 and CP2 in time.

With the construction described above, the anti-skid control system incorporating the system of this invention operates as follows. In the first place, the operation of the system, particularly the operation of the first and second counters 100 and 200, the clock pulse oscillator 400, the speed sensor 500 and the control circuit 300 will be described and later the operation of the braking force control unit 600 will be described with respect to different driving conditions of a vehicle by the driver, that is, (1) when the vehicle is driven at a constant speed, (2) when the brake pedal is depressed so that the rotational speed of the wheel is continuously decreasing under the influence of the braking force applied to the wheel (deceleration driving condition of the vehicle), and (3) the accelerator pedal is depressed so that the rotational speed of the wheel is increasing (acceleration driving condition of the vehicle).

The operation will be described by referring first to FIGS. 5 and 11. When the signal $an$ generated at the terminal A$n$ by dividing the clock pulses CP2 in the frequency divider circuit 340 goes to the H level at a time $t_o$, the reset signal $r$ is generated at the terminal R by the D-FF 350 through the AND element 321, so that the first and second counters 100 and 200 clear their previously stored counts and are reset to zero. Then, at a time $t_1$, the shift register 360 causes the signal $s1$ to go to the H level through the AND element 322. Consequently, the pulse signals wc are applied to the AND element 311 through the AND element 319 and the OR element 315. At this time, the carry output terminal C1 is of course at the L level, since the count of the counter 100 is zero. As a result, the output terminal of the NOT element 313 goes to the H level, with the result that the pulse signals wc generated at the OR element 315 are applied to the pulse input terminal T1 through the AND element 311 and the counter 100 starts counting the pulse signals wc from the time $t_1$ and on. In this case, since the signals $s2$ and $a$ at the terminals S2 and A are both at the L level, no clock pulses CP1 are applied to the counter 100. On the other hand, both the pulse signals wc and the clock pulses CP1 are not applied to the counter 200, and the count of the counter 200 is zero.

After expiration of $\Delta t$ seconds from the time $t_1$, that is, at a time $t_2$, the signal $s2$ at the terminal S2 changes from the L level to the H level by the operation of the shift register 370 through the AND element 323. Consequently, the pulse signals wc are generated at the output terminal of the OR element 316 through the AND element 320. In this case, the carry terminal C2 of the counter 200 is at the L and hence the output terminal of the NOT element 314 is at the H level, thus causing the pulse signals wc to be applied to the counter 200 through the AND element 312. The foregoing process may be summarized as follows: (1) The counters 100 and 200 are both reset at the time $t_o$, (2) the counter 100 starts counting the number of the pulse signals wc at the time $t_1$, and (3) the counter 200 starts counting the number of the pulse signals wc at the time $t_2$, and then at the expiration of the T1 seconds from the time $t_1$, i.e., at the time $t_3$ the signal $s1$ at the terminal S1 is changed to the L level by the shift register 360 through the AND element 322. When this occurs, no pulse signals wc appear at the output terminal of the AND element 319 and thus the counter 100 stops the counting of the pulse signals wc. In this case, as mentioned earlier, the count of the counter 100 attained during the T1 seconds has a value corresponding to the rotational speed of the wheel as mentioned previously. At this time, the signal $r$ at the terminal R and the signal $a$ at the terminal A are both at the L level so that the counter 100 is not reset and it also does not count the clock pulses CP1. Then, at a time $t_4$ after the expiration of the $T_1$ seconds from the time $t_2$, the signal $s2$ at the terminal S2 is changed to the L level by the shift register 370 through the AND element 323. As a result, no pulse signals wc applied to the AND element 320 are passed to its output terminal and hence the counter 200 stops counting the pulse signals wc from the time $t_4$ and on. In this case, the count stored in the counter 200 by this time assumes a value corresponding to the rotational speed of the wheel as in the case of the counter 100. Consequently, if the rotational speed of the wheel is constant during the time periods $t_1 \sim t_2 \sim t_3 \sim t_4$, the count of the counter 100 is equal to the count of the counter 200. On the other hand, if the rotational speed of the wheel varies during the time periods $t_1 \sim t_3$ and $t_2 \sim t_4$, the count of the counter 100 naturally differs from that of the counter 200. Thereafter, at the time $t_4$, the signal $a$ at the terminal A is changed to the H level by the shift register 380 through the AND element 324. Consequently, the clock pulses CP1 are applied to the OR elements 315 and 316 through the AND elements 317 and 318. In this case, the terminals R, S1 and S2 are all at the L level and therefore the pulse signals wc are not applied to the OR elements 315 and 316 through the AND elements 319 and 320. Further, the counters 100 and 200 are not reset. The carry output terminals C1 and C2 of the counters 100 and 200 are also at the L level and hence the output terminals of the NOT elements 313 and 314 are at the H level, with the result that the clock pulses CP1 generated at the output terminals of the OR elements 315 and 316 are applied to the counters 100 and 200. Thereafter, the counters 100 and 200 continue to count the clock pulses CP1 until a time $t_6$ at which the signal $a$ at the terminal A again goes to the L level. In this case, if the counts of the counters 100 and 200 which were stored respectively during the time periods $t_1 \sim t_3$ and $t_2 \sim t_4$ are equal to each other, the carry output terminals C1 and C2 of the counters 100 and 200 simultaneously go to the H level during a time period $t_4 \sim t_6$. And the signal $f$ at the output terminal F remains at the L level. The reason is that while the signal at one input terminal of the AND element 310 was at the H level and the signal at the other input terminal was at the L level when both of the carry output terminals C1 and C2 were previously at the L level, the signal at one input terminal of the AND element 310 is still at the H level and the signal at the other input terminal is at the L level when the carry output terminals C1 and C2 simultaneously go to the H level. On the contrary, if the rotational speed of the wheel is decreasing, the count stored in the counter 100 during the time period $t_1 \sim t_3$ is greater than the count stored in the counter 200 during the time period $t_2 \sim t_4$ and thus the signal $f$ at the output terminal F goes to the H level at a time $t_5$ which is later than the time $t_4$. This results from the fact that while the carry output terminals C1 and C2 were both at the L level before the time $t_5$ as mentioned earlier, the counters 100 and 200 start counting the clock pulses CP1 at the time $t_4$ thus causing only the carry output terminal C1 of the counter 100 to go to the H level at the time $t_5$. Thereafter, the output terminal of the NOT element 313 goes to the L level and therefore the clock pulses CP1 are not applied to the counter 100. On the other hand, the carry output terminal C2 of the counter 200 is still at the L level and therefore the counter 200 counts the clock pulses CP1. Thereafter, the signal $f$ at the output terminal F goes to the L level at the time $t_6$ at which the signal $a$ at the terminal A goes to the L level or before the time $t_6$ if the carry output terminal C2 of the counter 200 goes to the H level before the time $t_6$. On the contrary, if the rotational speed of the wheel is increasing, the count stored in the counter 100 during the time period $t_1 \sim t_3$ is smaller than the count stored in the counter 200 during the time period $t_2 \sim t_4$, so that when the clock pulses CP1 are to be counted by the counters 100 and 200, the carry output terminal C2 goes to the H level first and then the carry output terminal C1 goes to the H level. Consequently, the signal $f$ at the terminal F which was at the L level before the time $t_4$ remains at the L level after the time $t_4$, and thus it is always maintained at the L level not only at that time, i.e., when only the carry output terminal C1 goes to the H level first, but also the carry output terminal C1 goes to the H level later. When both of the carry output terminals C1 and C2 go to the H level, the outputs of the NOT elements 313 and 314 go to the L level, so that after that time no clock pulses CP1 are applied to the input terminals $T_1$ and $T_2$ and the counters 100 and 200 terminate their operation as mentioned earlier.

In other words, when the rotational speed of the wheel is increasing during the time period $t_1 \sim t_4$ or when the wheel is driven at a constant speed, no output signal is generated at the output terminal F during the time period $t_4 \sim t_6$. Namely, the signal $f$ remains at the L level, and only when the rotational speed of the wheel is decreasing during the time period $t_1 \sim t_4$, the output signal, i.e., the H level signal $f$ is generated at the output terminal F during the time period $t_4 \sim t_6$ for a time corresponding to the difference between the first rotational speed of the wheel and the second rotational speed of the wheel counted $\Delta t$ seconds later.

Thereafter, at a time $t_o'$, the H level signal $r$ is again generated at the terminal R, so that the counters 100 and 200 which stopped counting in the manner described above are reset and restored to their initial state or the zero state, after which the same sequence of operations are repeated at times $t_1'$, $t_2'$, $t_3'$ .... In this operation, since the rotational speed of the wheel is counted during the time period $T_1$ by the first counter 100 and the second counter 200 counts the rotational speed of the wheel during the same time period $T_1$ but $\Delta t$ seconds later, if the rotational speed of the wheel counted by the first counter 100 is represented as $V_1$ and $V_2$ represents the wheel rotational speed counted by the second counter 200 and if the H level output signal generated at the output terminal F after the time $t_4$ is represented as $f(t)$, then we obtain $$f(t) = K \frac{V_1 - V_2}{\Delta t}$$

where K = proportionality constant $$V_1 > V_2 = 0$$

Accordingly, when the rational speed of the wheel decreases rapidly in a short period of time the value of the output signal $f(t)$ is increased, whereas when the rotational speed of the wheel decreases gradually the value of the output signal $f(t)$ is decreased. Here, it should readily be appreciated that the values of $\Delta t$, $T_1$, $T_2$ as well as the values of the clock pulse CP1 and the pulse signal wc may be selected as desired entirely as a matter of design.

While there has been described the operation for generating an output signal at the output terminal F during the deceleration period of the rotational speed of the wheel, the operation of the braking force control unit 600 during such a deceleration period will now be described. As mentioned earlier, when the braking force control unit 600 is energized, it comes into operation in a direction which decreases the braking force. Consequently, when the rotational speed of the wheel is constant or when it is increasing, the braking force is not released as described above. On the other hand, when the rotational speed of the wheel is decreasing, as mentioned previously, the output signal $f(t)$ of varying time width which is dependent on the rate of decrease of the rotational speed of the wheel or the magnitude of the negative acceleration, is generated at the output terminal F at predetermined intervals of time. Consequently, the braking force control unit 600 actually acts in a direction which decreases the braking force during the time $f(t)$ in the time period $t_o \sim t_o'$, in FIG. 11, and therefore a time R$t$ during which the braking force applied to the wheel is released, is given as $$Rt = \frac{f(t)}{T} \cdot K$$

where
T = time period between $t_o$ and $t_o'$,
K = time delay efficiency determined by the characteristics of braking force control unit 600 and the brake system of vehicle As a result, after the application of the braking force to the wheel, in accordance with the value of the time R$t$ which is determined in the above-described manner by the ratio between the braking force application time T and the time $f(t)$ during which the control unit 600 acts in a direction which decreases the braking force, the braking force is decreased until the vehicle is brought to a stop. In other words, when the rate of decrease of the wheel rotation is low, the corresponding decrease in the braking force is small, whereas when the wheel rotation decreases rapidly, the braking force is reduced in an increased amount. When the rate of decrease of the wheel rotation becomes lower as the consequence of the decrease in the applied braking force, the rate of decrease in the braking force is reduced, whereas when the rotation of the wheel is brought to a constant speed or it gains speed again, the braking force is reapplied. The process just described is repeated until the vehicle is brought to a complete stop.

It will thus be seen from the foregoing description that since the system according to the present invention comprises a first counter for counting the number of pulse signals corresponding to the rotational speed of a rotating body, a second counter for counting the number of the pulse signals during the same time interval but at a later time than the first counter, and a control circuit for causing the first and second counter to count clock pulses after the completion of the counting of the pulse signals and generating an output signal having a time width which corresponds to the time interval between the instant that the count of one of the counters attains a predetermined value and the instant that the count of the other counter attains a predetermined value, it is possible to detect the rotational speed $V_1$ of the rotating body by the first counter and detect by the second counter the rotational speed $V_2$ of the rotating body after the expiration of $\Delta t$ seconds whereby to provide a control signal having a duration time corresponding to the rate of decrease in the rotational speed of the rotating body. The effect of this novel feature is that the operation of the system is stabilized against changes in the ambient temperature, variations of the power supply voltage, etc., which have heretofore been encountered in the conventional systems, and moreover there is no possibility of any erroneous operations due to ripple components and external noise thus eliminating the use of any special circuits for temperature compensation and voltage compensation. Further, since the rotational speed of the rotating body is detected at two points different by $\Delta t$ seconds to quickly detect the acceleration of the rotating body and provide the required control signal, the system of this invention can be advantageously used in such an application as an acceleration detecting system for an anti-skid control system to positively prevent the occurrence of skidding following the initiation of the braking action on the wheels.

What is claimed is:

1. A digital acceleration detecting system comprising:
    detecting means for generating pulse signals having a frequency corresponding to the speed of a rotating body to be detected;
    a first counter for counting said pulse signals from said detecting means during a predetermined period of time;
    a second counter for counting said pulse signals during said predetermined period of time which begins at a time different by a unit time from the time of the beginning of the counting by said first counter;
    an oscillator for generating clock pulses of a constant frequency; and
    control means for blocking the pulse signals from the detecting means after the elapse of both of the predetermined periods of said counters, for applying the clock pulses from said oscillator to said counters simultaneously for continuing the counts accumulated by said counters during said predetermined periods of time, and for generating an output pulse with a duration from the time when the count of said first counter reaches a predetermined value until the time when the count of said second counter reaches a predetermined value.

2. A digital acceleration detecting system according to claim 1, wherein said detecting means includes speed sensor for generating pulse signals with a frequency corresponding to the rotational speed of the wheel.

3. A digital acceleration detecting system according to claim 1, wherein said first and second counters each count in the same polarity.

4. A digital acceleration detecting system comprising:
    detecting means for generating pulse signals having a frequency corresponding to the speed of a rotating body to be detected;
    an oscillator for generating clock pulses with a constant frequency;
    a first gate means connected to said detecting means and said oscillator, for passing the pulse signals from said detecting means for a predetermined period, and for blocking said pulse signals thereafter and passing the clock pulses from said oscillator after the elapse of a given time of the blocking;
    a second gate means connected in parallel with said first gate means, for passing the pulse signals from said detecting means for a predetermined period from the time delayed by a given period from the beginning of the gating of said first gate means, and for blocking said pulse signals immediately thereafter and passing the clock pulses from said oscillator simultaneously with said first gate means;
    a first counter connected to said first gate means, for counting said pulse signals and said clock pulses passed by the gating of said first gate means;
    a second counter connected to said second gate means, for counting said pulse signals and said clock pulses passed by the gating of said second gate means; and
    a third gate means for generating an output pulse having duration from the time when the count of said first counter reaches a predetermined value until the time when the count of said second counter reaches a predetermined value.

5. A digital acceleration detecting system comprising:
    detecting means for generating pulse signals having a frequency corresponding to the speed of a rotating body to be detected;
    a first counter for counting said pulse signals from said detecting means during a predetermined period of time;
    a second counter for counting said pulse signals during said predetermined period of time which begins at a time different by a unit time from the time of the beginning of the counting by said first counter;
    an oscillator for generating clock pulses with a constant frequency; and
    control means for blocking the pulse signals from said detecting means after the elapse of both of the predetermined periods of said counters, and for applying the clock pulses from said oscillator to said counters for a further period whereby the control means generates an output pulse having a duration corresponding to the difference between the counts of said counters just before the application of said clock pulses.

* * * * *